United States Patent Office 3,189,639
Patented June 15, 1965

3,189,639
METHOD OF PRODUCING ALKYLENE
GLYCOL BORATES
William G. Woods, Anaheim, Calif., assignor to United
States Borax & Chemical Corporation, Los Angeles,
Calif., a corporation of Nevada
No Drawing. Filed Sept. 13, 1962, Ser. No. 223,554
8 Claims. (Cl. 260—462)

This invention relates to a method of producing alkylene glycol borates, and more particularly, this invention relates to a method of producing substituted dioxaborolane and dioxaborinane compounds.

The alkylene glycol borates of this invention are the compounds of the formula

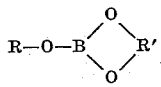

where R represents an alkyl, alkenyl, aralkyl or aryl group and R' is an alkylene radical of 2 to 3 carbon atoms in length and containing a total of from 2 to about 20 carbon atoms. When R' is an alkylene radical of 2 carbon atoms in length, the compound contains a 1,3-dioxa-2-borolane ring. When R' is an alkylene radical of 3 carbon atoms in length, the boron containing ring is a 1,3-dioxa-2-borinane. The carbon atoms of the ring can be unsubstituted or they can be substituted with one or more alkyl groups, such as the lower alkyl groups having from 1 to about 8 carbon atoms. The compounds are useful as epoxy resin curing agents, gasoline additives and as chemical intermediates.

It is the principal object of this invention to provide a method of producing alkylene glycol borates.

It is a further object of this invention to provide an efficient method of producing substituted dioxaborolane and dioxaborinane compounds in high yield from readily available starting materials. Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention provides a method of producing an alkylene glycol borate of the formula

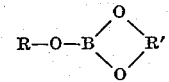

which comprises reacting a tris glycol biborate of the formula

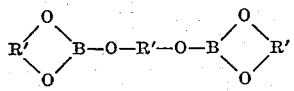

with an orthoborate of the formula (RO)$_3$B, where R is selected from the group consisting of alkyl, alkenyl, aralkyl and aryl, and R' is an alkylene radical of 2 to 3 carbon atoms in length and containing a total of from 2 to about 20 carbon atoms.

Examples of suitable groups represented by R are the alkyl and alkenyl radicals, and especially the lower alkyl and alkenyl radicals having from 1 to about 8 carbon atoms, straight or branched chain, such as methyl, ethyl, isopropyl, butyl, pentyl, 2-ethylhexyl, n-octyl, allyl, butenyl-3, and pentenyl-3; aralkyl radicals, and especially the monocyclic aralkyl radicals having 7 to about 10 carbon atoms, such as benzyl and phenylethyl; and aryl radicals, especially the monocyclic aryl radicals such as phenyl, and the nuclear substituted phenyl radicals. It is to be understood that the radicals represented by R can be substituted by groups such as alkyl, dialkylamino, nitro, halo, etc., which do not interfere with the glycol borate-forming reaction, and such substituted groups are intended to be included within the scope of the claims.

The reaction can be represented by the equation

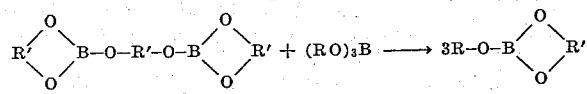

in which R and R' have the significance previously assigned. For best yields of the desired product, substantially equimolar amounts of the reactants are used.

The reaction is initiated by combining the reactants in a reaction vessel and heating at an elevated temperature, such as from about 35° to about 150° C., and preferably in the range of about 50° to about 100° C. The desired product, which forms almost immediately in nearly quantitative yields, can be separated from the reaction mass by distillation under reduced pressure. An inert liquid solvent or diluent can be used if desired, but does not appear to offer any processing advantages.

In the preferred embodiment of the invention, the reactants are combined in equimolar amounts in a reaction vessel, heated to a temperature of about 50° to about 100° C. and the desired product removed by distillation under reduced pressure as it is formed.

The reactants are well known to the art, being readily available. The tris glycol biborates can be prepared, for example, by the reaction of an alpha or beta glycol with boric acid in a 3:2 molar ratio as disclosed in United States Patent Number 2,741,548. Examples of suitable tris glycol biborate reactants include:

Tris(2-methyl-2,4-pentanediol)biborate
Tris(2,4-pentanediol)biborate
Tris(2-ethyl-2-butyl-1,3-propanediol)biborate
Tris(2,2-diethyl-1,3-propanediol)biborate
Tris(1,3-propanediol)biborate
Tris(ethyleneglycol)biborate
Tris(1-methyl-1,2-ethanediol)biborate
Tris(1,3-butanediol)biborate The orthoborates are also well known to the art and readily available. Examples of a few representative orthoborates are:

Trimethyl borate
Triethyl borate
Tri-n-butyl borate
Triallyl borate
Tri-n-octyl borate
Triphenyl borate
Tri-m,p-cresylborate
Tri-p-chlorophenyl borate
Tri-α-naphthyl borate
Tris-(β-dimethylaminoethyl)borate)
Tribenzyl borate Other useful reactants for the process will be obvious to those skilled in the art.

The following examples are presented for purposes of illustration and are not meant to limit the scope of this invention as modifications will be obvious to those skilled in the art.

EXAMPLE 1

*2-p-chlorophenoxy-4-methyl-1,3-dioxa-2-borinane*

A mixture of 39.35 grams (0.1 mole) of tri-p-chlorophenyl borate and 28.6 grams (0.1 mole) of tris (1,1-butanediol)biborate was heated for 2 hours at a temperature of about 150° C. The amber liquid was then distilled through a simple still head under reduced pressure. After collecting a crude forerun (10.8 g.) at 121.5°–124° C./0.5 mm., the desired product was collected at 105°–126° C./0.14–0.5 mm.; $n_D^{22}$ 1.5142. A total yield of 64.36 grams (94.7%) was obtained.

EXAMPLE 2

2-methoxy-4,4,6-trimethyl-1,3-dioxa-2-borinane

A mixture of 37.0 grams (0.1 mole) of tris(2-methyl-2,4-pentanediol)biborate and 10.4 grams (0.1 mole) of trimethyl borate was sealed under nitrogen in a Pyrex tube. The tube was heated at 130°–154° C. over a 3 hour period. Distillation of the reaction mixture through a short-path still head at atmospheric pressure gave the desired product (35.7 grams; 75.3% yield) boiling at 172°–177° C.; $n_D^{23.3}$ 1.4135.

EXAMPLE 3

2-n-butoxy-4-methyl-1,3-dioxa-2-borinane

A mixture of 71.5 grams (0.25 mole) of tris(1,3-butanediol)biborate and 57.5 grams (0.25 mole) of tri-n-butyl borate was heated for two hours at 150° C. Distillation of the product mixture through a short Vigreux column under reduced pressure gave the pure product at 33°–40° C./0.14–0.17 mm. A forerun of crude product was collected at 44°–47° C./0.18–0.19 mm. A total yield of 120 grams (93%) was obtained.

EXAMPLE 4

2-allyloxy-4,4,6-trimethyl-1,3-dioxa-2-borinane

A mixture of 91.0 grams (0.5 mole) of triallyl borate and 185.1 grams (0.5 mole) of tris(2-methyl-2,4-pentanediol)biborate was heated and the reaction mixture distilled under reduced pressure through a short Vigreux column. The desired product was collected at 81°–84° C./5.5–5.9 mm.; $n_D^{22}$ 1.4278. Yield: 238.1 grams (86.3%).

EXAMPLE 5

2-(β-dimethylaminoethoxy)-4,4,6-trimethyl-1,3-dioxa-2-borinane

An equimolar mixture of 88.5 grams of tris (β-dimethylaminoethyl)borate and 119.2 grams of tris(2-methyl-2,4-pentanediol)biborate was heated and distilled through a short Vigreux column under reduced pressure to give the desired product (139.2 g.; 67% yield) boiling at 62°–55.5° C./0.26–0.18 mm.; $n_D^{25.7}$ 1.4319.

EXAMPLE 6

2-m,p-cresyloxy-4-methyl-1,3-dioxa-2-borinane

A mixture of 143 grams (0.5 mole) of tris(1,3-butanediol)biborate and 166.1 grams (0.5 mole) of tri-m,p-cresyl borate was charged to a reaction vessel and heated for two hours at 150° C. The reaction mixture was then distilled under reduced pressure. After taking off a 51 gram forerun, the desired product was collected at 83°–88° C./0.14–0.15 mm.; $n_D^{24.3}$ 1.5005. A yield of 243.3 grams (94.2%) of the product was obtained.

EXAMPLE 7

2-m,p-cresyloxy-4,4,6-trimethyl-1,3-dioxa-2-borinane

A mixture of 100 grams (0.2705 mole) of tris(2-methyl-2,4-pentanediol)biborate and 89.8 grams (0.2705 mole) of tri-m,p-cresylborate was stirred and heated at 100°–140° C. for 1.75 hours. Distillation of the reaction mixture under reduced pressure through a short Vigreux column gave the desired product boiling at 87.5°–91.5° C./0.17–0.27 mm.; $n_D^{25}$ 1.4878. A total yield of 164.5 grams (86.6%) of the product was obtained.

EXAMPLE 8

2-benzyloxy-4-methyl-1,3-dioxa-2-borolane

A mixture of 73.2 grams (0.3 mole) of tris(1,2-propanediol)biborate and 99.6 g. (0.3 mole) of tribenzyl borate was distilled slowly through a short Vigreux column under reduced pressure. The desired product was collected at 95.5°–102° C./0.37–0.27 mm.; $n_D^{25.5}$ 1.4991–1.5010 (three fractions). A total yield of 134.7 grams (78%) of the product was obtained.

Other modes of applying the principle of the invention may be employed, change being made as regards the details described, provided the features stated in any of the following claims or the equivalent of such be employed.

I, therefore, particularly point out and distinctly claim as my invention:

1. The method of producing an alkylene glycol borate of the formula

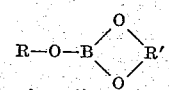

which comprises reacting at a temperature of from about 35° to about 150° C. a tris glycol biborate of the formula

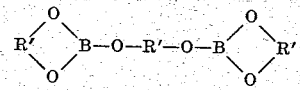

with an orthoborate of the formula (RO)₃B, where R is selected from the group consisting of alkyl, alkenyl, aralkyl and aryl and R′ is an alkylene radical of 2 to 3 carbon atoms in length and containing a total of from 2 to about 20 carbon atoms.

2. The method of claim 1 in which said R′ is 1,1,3-trimethyl propylene.

3. The method of claim 1 in which said reaction takes place at a temperature of from about 50° C. to about 100° C.

4. The method of producing an alkylene glycol borate of the formula

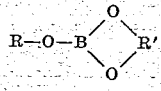

which comprises combining, in equimolar amounts, a tris glycol biborate of the formula

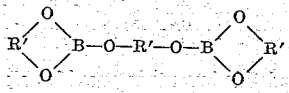

with an orthoborate of the formula (RO)₃B, heating said combination to a temperature in the range of about 35° C. to about 150° C. and separating said alkylene glycol borate from the resulting reaction mixture by distillation under reduced pressure; where R is selected from the group consisting of alkyl, alkenyl, aralkyl and aryl and R′ is an alkylene radical of 2 to 3 carbon atoms in length and containing a total of from 2 to about 20 carbon atoms.

5. The method of claim 4 in which said R′ is 1,1,3-trimethylpropylene.

6. The method of claim 4 in which said R′ is 1-methylpropylene.

7. The method of claim 4 in which said combination is heated to a temperature in the range of about 50° C. to 100° C.

8. 2-p-chlorophenoxy-4-methyl-1,3-dioxa-2-borinane.

References Cited by the Examiner

UNITED STATES PATENTS 3,064,033   11/62   English _____ 260—462

CHARLES B. PARKER, *Primary Examiner.*

L. D. ROSDOL, *Examiner.*